Figure 1:
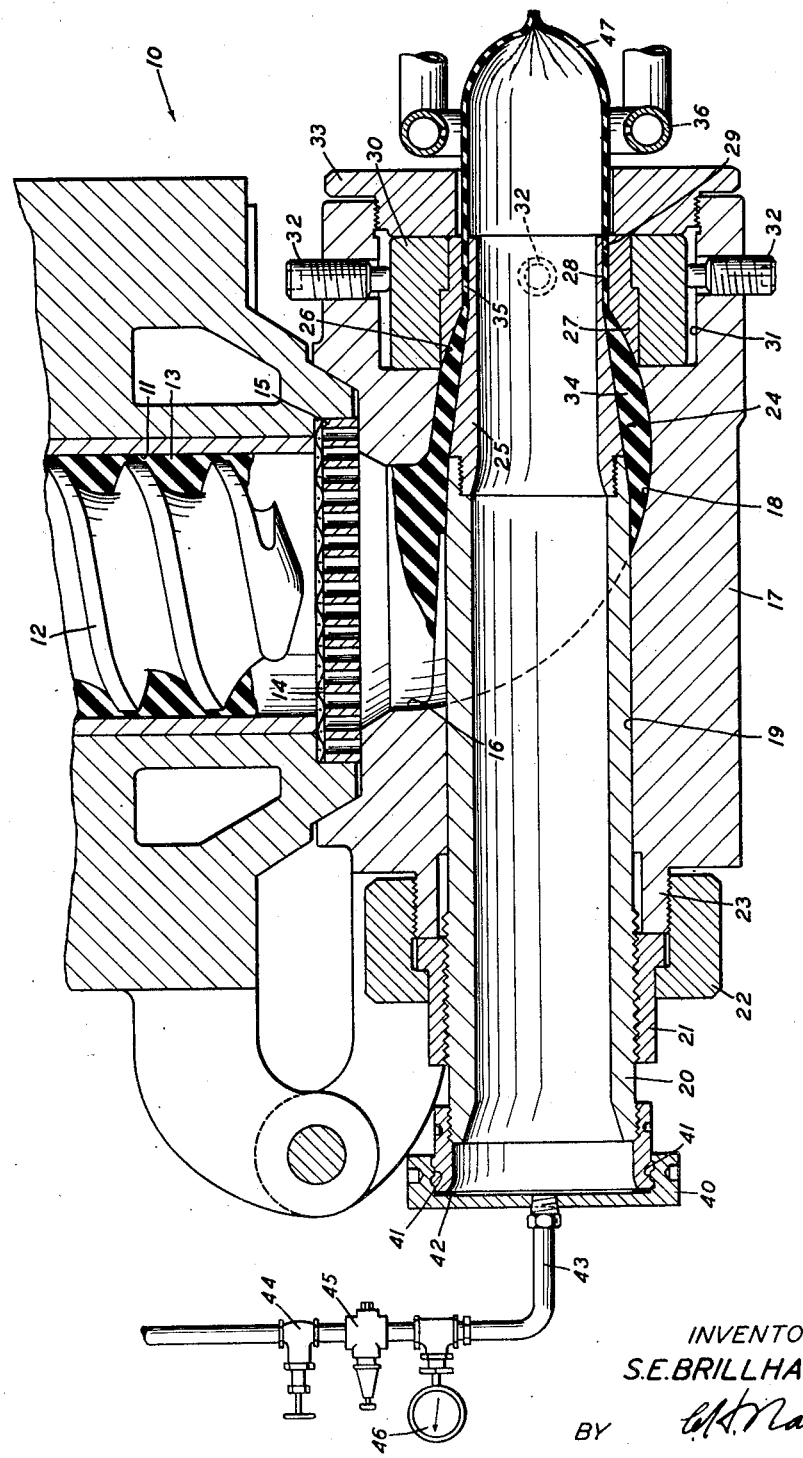

March 27, 1951

S. E. BRILLHART 2,546,629

METHOD OF POSITIONING A FORMING DIE
WITH RESPECT TO A CORE TUBE
Filed Dec. 15, 1947

INVENTOR
S.E. BRILLHART
BY
ATTORNEY

Patented Mar. 27, 1951

2,546,629

UNITED STATES PATENT OFFICE 2,546,629

METHOD OF POSITIONING A FORMING DIE WITH RESPECT TO A CORE TUBE

Samuel E. Brillhart, Lutherville, Md., assignor to Western Electric Company, Incorporated, New York, N. Y., a corporation of New York Application December 15, 1947, Serial No. 791,909

1 Claim. (Cl. 18—55)

This invention relates to extruding methods and particularly to methods of locating a forming die with respect to a core tube positioned in an extruding apparatus.

An object of the invention is to provide new and improved extruding methods.

A further object of the invention is to provide new and improved methods for locating a forming die with respect to a core tube positioned in an extruding apparatus.

Another object of the invention is to provide new and improved methods of accurately positioning a forming die with respect to a core tube of an extruding apparatus without advancing a core through the apparatus.

An apparatus that may be utilized to practice a method embodying certain features of the invention comprises means for effecting an air tight closure of the cable receiving end of a core tube holder forming part of an extruding apparatus and having an orifice provided therein which is connected to a suitable compressed air supply line so that air under pressure may be admitted into the core tube, means for regulating the pressure of the air admitted into the core tube, and means for indicating the pressure of the air in the core tube. The apparatus is operated without advancing a cable core therethrough to extrude a tube. The end of the tube is sealed, whereupon the air admitted into the tube prevents it from collapsing so that a substantially cylindrical tube is produced by the apparatus. The wall thickness of the resulting tube is measured to determine whether the die is properly positioned with respect to the core tube.

A method embodying certain features of the invention comprises extruding plastic material through an extrusion orifice in a forming die to form an open ended tube, sealing the open end of the extruded tube to render it air tight, admitting air under pressure into the core tube and the extruded tube, said air pressure serving to maintain the extruded tube in its tubular shape, and adjusting the forming die of the extruding apparatus to correct any non-uniformity that exists in the wall thickness of the extruded tube.

A clear understanding of the invention will be had from the following detailed description of an apparatus by means of which methods embodying the invention may be practiced, when read in conjunction with the appended drawing, in which the single figure is a horizontal, sectional view of a portion of an extruding apparatus showing a preferred embodiment of the invention in its operating position.

Referring now to the drawing, a portion of an elongated extrusion cylinder forming part of a conventional extruding machine is indicated generally on the drawing by the numeral 10. The cylinder 10 is provided with a central bore 11 in which is rotatably positioned a conventional material advancing screw 12. Suitable extrudable material 13 is supplied to the bore 11 of the cylinder 10 from a suitable hopper (not shown), and as the screw 12 is rotated in the proper direction and the material is advanced thereby along the bore 11 to a screen 14 resting against a perforated plate 15 positioned in a counterbore provided in the end of the cylinder 10. Examples of extrudable materials that may be used with this type of extruding apparatus are rubber compounds, synthetic rubberlike compounds or extrudable thermoplastic materials, such as polyethylene, polyvinyl chloride plastics and plastics produced by the conjoint polymerization of vinyl chloride and vinyl acetate.

The screw 12 forces the material 13 through the screen 14 and the holes in the perforated plate 15 into an opening 16 provided in an extruding head 17 hingedly mounted on the cylinder 10. When the head 17 is in operative position, a material passageway 18 formed in the head 17 communicates with the opening 16 and changes the direction of travel of the material 13 in the head 17 to one along the longitudinal axis of the head. A bore 19 is provided in the head 17 at right angles to the annular opening 16 and communicating with the passageway 18 for slidably receiving a tubular core tube holder 20.

The core tube holder is located at the desired position in the head 17 by means of a collar 21 threadedly mounted on the body of the core tube holder and a ring 22 slidably mounted on the collar so as to threadedly engage a hub 23 provided on the left end of the head 17. A core tube indicated generally at 24 is threadedly mounted on the inner end of the core tube holder 20 so that a frustoconical portion 25 thereof extends through the material passageway 18, and a tapered bore 26 provided in the adjacent end of a forming die 27. An elongated tubular body portion 28 is formed on the end of the frustoconical portion 25 and extends to the end of a central bore 29 provided in the die 27.

The die 27 is positioned centrally in a die holder 30 mounted in a counterbore 31 provided in the right end of the head 17. The die holder 30 is supported at equal points about its periphery by a plurality of set screws 32—32 threadedly mounted in the head 17. The set screws 32—32 provide an adjustment for the die holder 30 within the counterbore 31 so that the die 27 may be properly positioned with respect to the core tube 24. A nut 33 is threadedly mounted in a tapped portion of the counterbore 31 to secure the die holder 30 in place after the die holder has been properly centered therein by means of the set screws 32—32.

The tapered bore 26 of the die 27 and the adjacent portion of the passageway 18 coact with the frustoconical part 25 of the core tube 24 to form an annular extrusion passageway 34 in the head 17. This extrusion passageway communicates directly with an elongated extrusion orifice 35 formed between the central bore 29 of the die 27 and the exterior of the tubular body portion 28 of the core tube 24. After the extrudable material 13 has been forced by the screw 12 through the screen 14 and the perforated plate 15 into the opening 16, the material travels into the passage 18 and thence through the extrusion passageway 34 into the elongated extrusion orifice 35.

Normally the material is extruded from the orifice 35 as an insulating covering around a cable core (not shown) being advanced from left to right through the core tube holder 20 and the core tube 24. A perforated, tubular ring 36 is positioned adjacent to the nut 33 and is supplied with water which is sprayed therefrom on the covering as the covering and core emerge from the nut 33 for the purpose of cooling the extruded covering.

In extruding a covering around a cable core, it is desirable that the covering be of uniform wall thickness in order to provide the required protection at all points around the core. In order to obtain a covering having a uniform wall thickness, the forming die 27 must be so positioned with respect to the body portion 28 of the core tube 24 that an equal flow of material 13 occurs throughout the orifice 35. Due to the particular construction of the above-described type of extruding apparatus it is practically impossible to assemble the die holder and core tube in the apparatus so that a covering having uniform wall thickness will be extruded on the cable upon the initial operation of the apparatus. For the purpose of determining what type of covering will be extruded after the initial assembly of the core tube and die, it has been the practice in the past to advance a short length of a cable core through the extruding head and to extrude a covering around the length of cable core. After a given length of the cable core had passed through the extruding head, a portion was severed therefrom and the covering was measured to determine whether the wall of the covering was of uniform thickness throughout its periphery. If the wall thickness of the covering was not uniform, the die holder was adjusted in an attempt to correct the error and a covering was extruded on another length of cable core so that its wall thickness could be measured.

With this method, each time the die holder is adjusted to a new position, it is necessary to run a length of the cable core through the apparatus in order to determine whether the die is positioned correctly with respect to the core tube. Cable cores used in the manufacture of telephone cables are very expensive, therefore, this method of determining the proper position of the forming die in the extruding head for a given extruding operation is a very costly one.

The scrapping of several lengths of cable core in determining the proper position of the forming die with respect to the core tube of such extruding apparatus is eliminated in accordance with this embodiment of the invention by providing a cap 40 having breach-type threads 41—41 so that it may be threadedly mounted on the entrance end of the core tube holder 20. The cap 40 is used in place of the end guide (not shown) which normally is positioned on the entrance end of the core tube holder when a cable core is being advanced through the extruding head 17. A gasket 42 is positioned inside the cap 40 to render the connection between the cap and the end of the core tube holder 20 substantially air tight.

A flexible air hose 43 is secured to a threaded opening provided in the cap for directing air under pressure from a suitable supply source (not shown) into the core tube holder and the core tube. A cutoff valve 44 and a pressure regulating valve 45 are connected in the air line 43 to control the rate at which the air is admitted into the core tube and to regulate the pressure of the air in the core tube, respectively. A pressure gage 46 is positioned in the air line 43 between the pressure regulating valve 45 and the core holder 20 to indicate the air pressure existing within the core tube holder 20 and the line 43.

The purpose of admitting the air under pressure to the core tube holder 20 and the core tube 24 is to use it instead of a length of cable core as a means for holding the extruded material in a substantially tubular shape so that its wall thickness may be accurately measured by means of which measurements the proper position of the die 27 is obtained. The compressed air is utilized for this purpose in the following manner:

The extruding apparatus including the screw 12 is first operated without advancing a cable core through the core tube, in which case the extrudable material 13 is extruded from the extrusion orifice 35 to form a soft, pliable, irregularly shaped and open ended tube 47. Since the material forming the tube 47 is very hot and soft, the open end of the tube may be squeezed together to form an air tight joint thereat. After the end of the tube is closed in this manner, the valve 44 is operated to admit the compressed air into the core tube holder 20 and the sealed tube 47 emerging from the extrusion orifice 35. The pressure of the air within the extruded tube 47 serves to prevent the hot, soft tube from collapsing so that as the extrusion apparatus continues to operate, a substantially cylindrical tube will emerge from the orifice 35 and will pass through the water spray ring 36. The water spray serves to cool the inflated tube and causes it to set in the shape in which is it maintained by the compressed air. The air pressure within the tube 47 is regulated by the valve 44 so that the tube 47 will not be deformed or expanded by the air after it leaves the die 27.

The extruding apparatus is permitted to operate in this manner for a period of time sufficient to produce a suitable test length of the extruded tube 47, after which the air valve 44 is closed and the extrusion apparatus is stopped. A portion of the tube 47 is cut off so that its wall thickness is measured by suitable micrometer calipers, to see whether its wall thickness is uniform.

The wall thickness of the extruded tube may be measured in several ways. For example, the extruded tube may be severed at a convenient point beyond the water spray ring 36, and the wall thickness of the portion of the tube attached to the apparatus may be measured. In this method, the direction in which the die 27 must be moved to obtain a uniform wall thickness is readily apparent because the tube is attached to the apparatus. The severed portion of the extruded tube also may be used for measurements of the wall thickness, in which case the severed portion of the tube must be suitably marked, such as by placing a mark on the top thereof. In this way the severed portion of the tube is oriented with respect to the extruding die so that the die may be properly adjusted to correct any non-uniformity which may be determined in the wall thickness of the severed portion of the tube.

If the wall thickness of the extruded tube 47 is not uniform throughout its periphery, it is necessary to adjust the position of the forming die 27 with respect to the body portion 28 of the core tube 24 in the direction which will correct the non-uniformity. This adjustment is made by loosening the nut 33 and adjusting the screws 32—32 to move the die holder 30 in the desired direction, after which the nut 33 is tightened to hold the die and the die holder in the new position.

The extruding apparatus is again operated and the open end of the extruded tube 47 is again squeezed together so as to render the end of the tube air tight. Air is again admitted into the core tube holder 20, the core tube 24 and the extruded tube 47 while a suitable length of the tube is extruded from the orifice 35, and cooled by the water spray through the nut 33 and from the ring 36. Then the extruding operation is terminated and a portion of the extruded tube 47 is cut off and its wall thickness measured to determine if the extrusion orifice 35 is extruding a tube having a uniform wall thickness. This procedure is continued until the die 27 is set so that a tube having uniform wall thickness is produced.

After the proper position of the die 27 has been obtained by this procedure, the cap 40 is removed from the entrance end of the core tube holder and the regular cable core guide (not shown) is positioned in its regular place on the entrance end of the core tube holder. The extruding apparatus is now adjusted to extrude a covering around a given cable core, which, when advanced through the extrusion orifice formed by the core tube and the forming die at a constant rate of speed will receive a covering having a uniform wall thickness.

The above-described apparatus serves to facilitate the location of a forming die in an extruding head employed to apply a covering on a cable being advanced through the extruding apparatus in a more economical and facile manner than any apparatus in use at the present time. The apparatus is relatively simple in construction and operation, and provides an extremely accurate and inexpensive means for obtaining the proper position of a forming die in its associated extruding apparatus so that coverings extruded thereby will have uniform wall thicknesses.

While air under pressure has been described as the means for preventing the extruded tube from collapsing as it emerges from the extrusion orifice, it is to be understood that other gases may be used in place thereof with equally satisfactory results. For example, low pressure steam may be used, or other gases, such as nitrogen, carbon dioxide, or the like, may be used and in some instances may be required because of the type of material employed. Air under pressure was described as the means of carrying out the principles of the above-described invention because it is, in many instances, the least expensive and more readily available means.

What is claimed is:

The method of adjusting a die positioned in an apparatus having an elongated tubular core tube holder provided with a core tube on one end thereof which coacts with the die to form an annular extrusion orifice through which an extrudable thermoplastic material may be extruded around a core being advanced through the die, so that the apparatus extrudes a covering on the core having uniform wall thickness throughout its periphery, which comprises closing the core receiving end of the core tube holder to render it air tight, forcing thermoplastic material through the extrusion orifice to form an extruded tube without advancing a core through the orifice, closing the end of the tube being extruded to render the tube air tight, admitting air into the core tube holder at a pressure sufficient to prevent the extruded tube from collapsing as it emerges from the extrusion orifice, terminating the extrusion operation when a predetermined length of the air-filled extruded tube has been formed, cooling the air-filled tube to room temperature as it emerges from the extrusion orifice to harden it, examining the extruded tube for irregularities in the wall thickness thereof, adjusting the die with respect to the core tube so as to compensate for any non-uniformities in the wall thickness of the extruded tube, and repeating the above steps in the order named until the die is so positioned with respect to the core tube that when a core is advanced through the apparatus the extrusion orifice will form a sheath on the core having uniform wall thickness.

SAMUEL E. BRILLHART.

REFERENCES CITED

The following references are of record in the file of this patent:

UNITED STATES PATENTS

| Number | Name | Date |
| --- | --- | --- |
| 1,196,648 | Bleecker | Aug. 29, 1916 |
| 1,601,686 | Henderson | Sept. 28, 1926 |
| 2,121,966 | Jacobson | June 28, 1938 |

FOREIGN PATENTS

| Number | Country | Date |
| --- | --- | --- |
| 3,999 | Great Britain | July 25, 1891 |
| 343,434 | Great Britain | Feb. 9, 1931 |